Jan. 31, 1967 J. T. DALE 3,301,075

MEMORY DEVICE

Original Filed Feb. 14, 1961 2 Sheets-Sheet 1

INVENTOR

John Traviss Dale

BY Smart & Biggar

ATTORNEYS.

Inventor
John Traviss Dale
By- Smart & Biggar.
Attorneys.

United States Patent Office 3,301,075
Patented Jan. 31, 1967

3,301,075
MEMORY DEVICE

John Traviss Dale, Scarboro, Ontario, Canada, assignor to Her Majesty the Queen in Right of Canada as represented by the Minister of National Defence Original application Feb. 14, 1961, Ser. No. 89,150, now Patent No. 3,205,346, dated Sept. 7, 1965. Divided and this application Dec. 16, 1963, Ser. No. 330,852
2 Claims. (Cl. 74—10.2)

This invention relates to "mechanical memory" devices capable of storing and repeating analogues expressed in terms of shaft rotation.

This application is divided from copending application Ser. No. 89,150, filed Feb. 14, 1961 and issued to patent on Sept. 7, 1965 under No. 3,205,346.

In my aforementioned patent application there is described and claimed a dead reckoning navigational computer capable of computing from such information analogue inputs as aircraft true heading, air speed, wind speed and wind direction, the change in aircraft position expressed as a change in longitude and a change in latitude. The analogue data is, in each case, expressed in increments of shaft rotation.

It is often desired to upset the normal functions of the computer without interfering with the continuous positional calculation and under these circumstances it is necessary to store the analogue data concerning the change in longitude and the change in latitude. It will be appreciated that in aircraft having great ranges, the information to be stored can in certain conditions be the accumulation of change in position elapsing over several hours' flight.

The problem with which the inventor was faced was to provide a "memory" device which would be compact enough for use in an airborne navigational computer where space is at a premium and at the same time would be sufficiently positive and accurate enough to repeat the stored information within fine limits.

According to the present invention a memory device for storing analogue information comprises an input shaft, a first gear wheel on said shaft, a pinion gear meshing with said first mentioned gear, second and third gear wheels independently mounted for rotation in mating engagement with said pinion gear, the number of teeth in said first, second and third gears being in the ratio of $n{:}n+1{:}n-1$; and means associated with said gear wheels for indicating when said memory device is clear.

The following is a description by way of example of one embodiment of the invention reference being had to the accompanying drawings in which.

Figure 2:
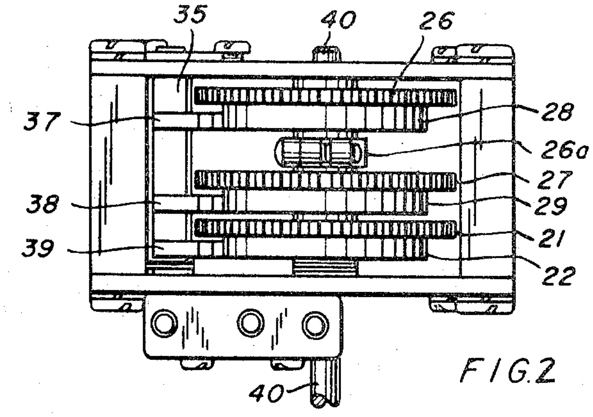
FIGURE 2 is a plan view of the device of FIGURE 1.
Figures 1, 3A:
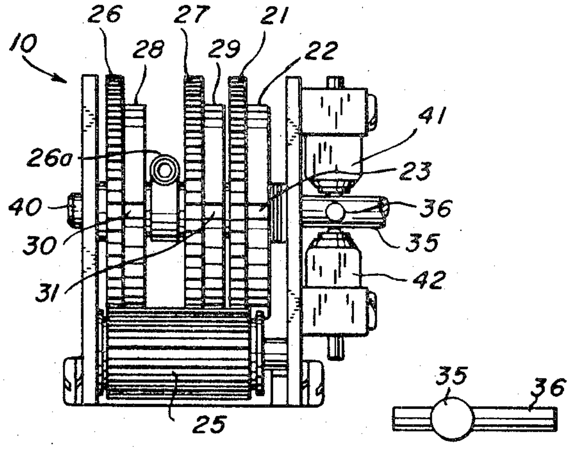
FIGURE 1 is an elevation with certain parts being omitted for the sake of clarity.
Figure 3:
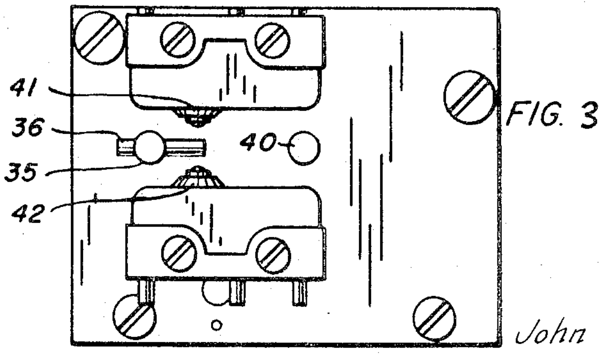
Figure 4:
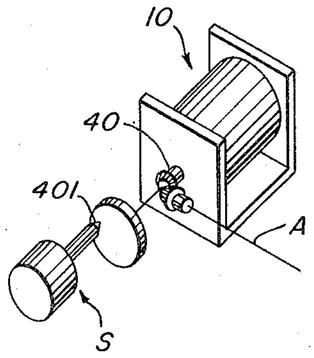

FIGURES 3 and 3*a* are details of a micro-switch associated with the device of FIGURES 1 and 2; and FIGURE 4 is a schematic representation of a detail of a brake.

Referring now to the drawings: Analogue information in the form of a shaft rotation may be fed to the "memory" device from an analogue shaft A and stored in the "memory" by rotating the shaft 40 which is coupled to the gear 26 by a coupling device 26A. The gear 26 has a skirt 28 integral therewith and provided on its periphery with a slot 30. The gear 26 meshes with a cylindrical pinion gear 25 mounted for rotation in the frame of the device 10. The pinion gear 25 in turn drives two further gear wheels 27, 21 which are mounted for independent rotation on the shaft 40. Each of the gears 27, 21 is provided with a skirt 29, 22 respectively. The skirts 29, 22, have radial slots 31, 23 in their periphery. These slots are similar to the slot 30 in the skirt 28 and the gear

27 is formed with one less tooth than the gear 26, whilst the gear 21 has one more tooth than the gear 26.

When not in use the "memory" device will rest as shown in FIGURE 2 with the slots 30, 31, and 23 aligned and with the pawls 37, 38 and 39 engaged therein.

When it is desired to actuate the "memory" device a remote switch (not shown) is pushed releasing a solenoid operated brake S for the aforementioned analogue shaft A and shaft 40 is then rotated in accordance with the incoming analogue: information on the analogue shaft. The gear 26 is driven and its slot 30 cams its related pawl out of engagement with the slot and rotates the shaft 35 and the other pawls thereon. At the same time the pinion 25 rotates the gears 27, 21 and the "memory" device stores the incoming analogue information.

On the pawl shaft 35 there is a pin 36 which contacts one or other of the micro switches 41 or 42 depending upon the sense of rotation of the pawl shaft 35. When the storing of information in the memory device is complete and it is desired to "read out" or repeat the information stored therein a motor (not shown) is energized and it drives the shaft 40 in the required sense (previously detected by the particular micro switch 41 or 42) and "reads out" the information until the slots 30, 31 and 23 are again aligned permitting the pawls to fall into place and open the micro switch 41 or 42 depending upon which one has been closed. Suitable electrical connections may be provided to release the brake S for the analogue shaft when the aforementioned motor is actuated. Now the opening of the micro switch 41 or 42 stops this motor and also releases the brake. In order to avoid "hunting" of the "memory" a disc 400 may be provided on an extension of the shaft 40 and the brake may be provided with a cone-shape projection 401 on the outer end of its armature whilst the disc 400 may be provided with a cone-shaped indentation to receive the armature projection 401. Thus as the pawls of the memory engage in their respective slots and open the micro switch the driving motor for the memory is stopped and an instantaneous braking is obtained by the release of the armature of the solenoid brake S. This action immediately stops any inertial rotation by the memory gear wheels and thus the pawls are not urged involuntarily out of engagement to make one of the micro switches and cause "hunting" of the memory.

What I claim as my invention is:

1. A memory device for storing analogue information comprising an input drive shaft, a gear wheel keyed to said shaft, a slotted index element mechanically connected to said gear wheel, a pinion meshing with said first mentioned gear wheel and driven thereby, second and third gear wheels arranged coaxially with said first mentioned gear wheel and independently mounted for rotation in mating engagement with said pinion to be driven by said pinion, slotted index means mechanically connected to said second and with said third gear wheels; said gear wheels having a number of teeth in the ratio of $n{:}n+1{:}n-1$; a pawl shaft adjacent said gear wheels, a plurality of pawls rigidly connected to said shaft and each adapted to engage in one of said slotted index means; and swich actuating means connected to said pawl shaft and adapted to operate switch means when said pawls are out of engagement with their respective slotted index means.

2. A memory device as claimed in claim 1 further comprising disc brake means on said input shaft; solenoid operated braking means operated by said switch actuating means, said brake disc being provided with a cone-shaped indentation and said brake means being provided with a cooperating projection whereby actuation of the solenoid operated brake means operates positively to engage the disc brake and positively lock the memory device to prevent "hunting."

References Cited by the Examiner

UNITED STATES PATENTS

| | | | |
|---|---|---|---|
| 1,795,420 | 3/1931 | Beall | 192—142 |
| 2,389,350 | 11/1945 | Exner | 192—142 |
| 2,519,907 | 8/1950 | Hodgson | 192—142 |
| 2,576,305 | 11/1951 | Merles | 74—10.2 |
| 2,824,452 | 2/1958 | Colby | 74—10.2 |
| 2,972,258 | 2/1961 | Vervest et al. | 74—10.2 |
| 3,147,629 | 9/1964 | Michalu | 74—10.2 |

FRED C. MATTERN, Jr., *Primary Examiner.*

BROUGHTON G. DURHAM, *Examiner.*

F. E. BAKER, *Assistant Examiner.*